United States Patent
Binetti et al.

(10) Patent No.: US 7,778,549 B1
(45) Date of Patent: Aug. 17, 2010

(54) UNIDIRECTIONAL DROP AND CONTINUE USING BIDIRECTIONAL TRANSPONDER

(75) Inventors: Stefano Binetti, Monza (IT); Maruizio Gazzola, Milan (IT); David Bianchi, Cambiago (IT)

(73) Assignee: Cisco Technology, Inc., San Jose, CA (US)

( * ) Notice: Subject to any disclaimer, the term of this patent is extended or adjusted under 35 U.S.C. 154(b) by 680 days.

(21) Appl. No.: 10/867,028

(22) Filed: Jun. 14, 2004

(51) Int. Cl.
*H04J 14/02* (2006.01)

(52) U.S. Cl. ............... 398/83; 398/173; 398/58; 398/66; 398/67; 398/68; 398/175; 398/180

(58) Field of Classification Search ......... 398/58–72, 398/93, 107, 173–181, 83; 370/221, 222
See application file for complete search history.

(56) References Cited

U.S. PATENT DOCUMENTS

| | | | |
|---|---|---|---|
| 6,348,985 B1 * | 2/2002 | Jiang et al. ................. | 398/82 |
| 6,493,118 B1 | 12/2002 | Kartalopoulos | |
| 6,501,871 B1 * | 12/2002 | Sucharczuk et al. ........ | 385/24 |
| 6,519,064 B1 | 2/2003 | Fatehi et al. | |
| 6,532,089 B1 * | 3/2003 | Asahi .......................... | 398/82 |
| 6,853,763 B1 * | 2/2005 | McNicol et al. ............ | 385/17 |
| 2002/0003639 A1 * | 1/2002 | Arecco et al. .............. | 359/119 |
| 2002/0080438 A1 * | 6/2002 | Beine et al. ................ | 359/110 |
| 2003/0219255 A1 * | 11/2003 | Jaggi et al. ................. | 398/139 |
| 2005/0111495 A1 * | 5/2005 | Gumaste et al. ............ | 370/535 |
| 2005/0213970 A1 * | 9/2005 | Kimura et al. .............. | 398/45 |
| 2006/0045519 A1 * | 3/2006 | Oren .......................... | 398/4 |

* cited by examiner

*Primary Examiner*—Li Liu (57) ABSTRACT

Systems and methods for unidirectional communication in an optical network employing bidirectional transponders are provided. The modulation and amplification capabilities of the bidirectional transponder are used to forward information to the next node. In this way a highly cost-effective "drop and continue" architecture is provided. In one implementation, the client-side output of the bidirectional transponder is looped back to the client-side input using, e.g., a Y-cable fiber. In this way, a unidirectional signal present on a network-side input wavelength to the transponder is presented both on a network-side output wavelength of the transponder and at the same time to a client. The modulation and amplification capabilities of the bidirectional transponder are thus exploited in forwarding the unidirectional signal to the next node.

22 Claims, 5 Drawing Sheets

UNIDIRECTIONAL DROP AND CONTINUE USING BIDIRECTIONAL TRANSPONDER

BACKGROUND OF THE INVENTION

The present invention relates to optical networking, and more particularly in certain embodiments to systems and methods for unidirectional broadcast of information such as, e.g., video information.

High-performance optical networks have facilitated the emergence of the Internet as a widely prevalent medium for business and personal communications. Principal applications enabled by such networks include, e.g., large-scale web access, voice over Internet telephony, electronic mail, peer-to-peer file sharing, etc. A common attribute of these particular applications is that they involve bidirectional communication of data.

Figure 1:
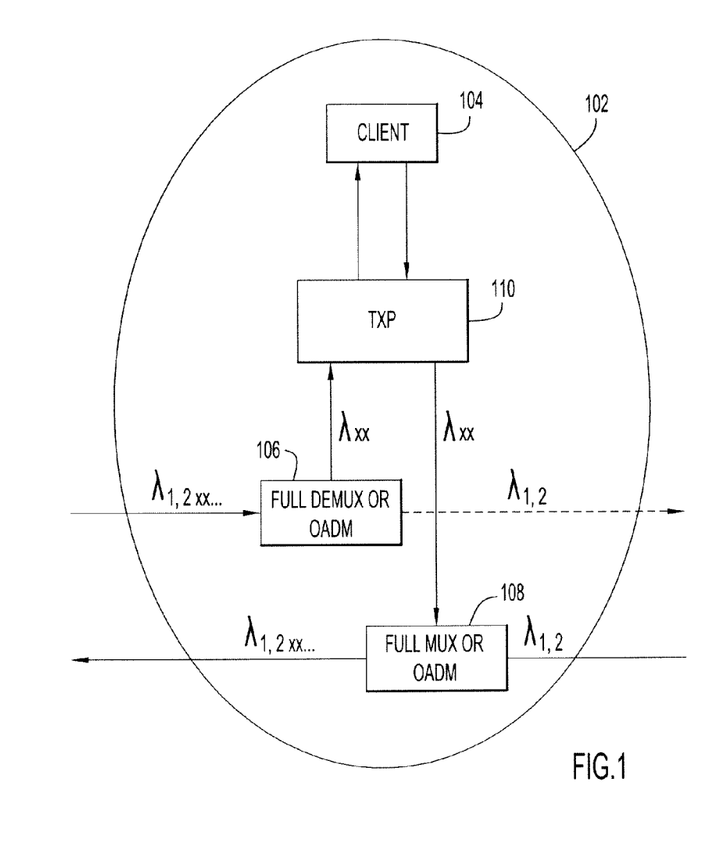
FIG. 1 depicts a node in a prior art bidirectional optical communication architecture.

FIG. 1 depicts a representative node 102 in a typical bidirectional optical network architecture. Multiple wavelengths $\lambda_1$, $\lambda_2$, etc. enter and leave node 102 via optical fiber in two different directions. The information received on a particular wavelength $\lambda_{xx}$ present on light flow in a first direction is to be made available for a local client 104. Information generated by client 104 is modulated onto the same $\lambda_{xx}$ on light flow in the opposite direction so as to return to the source of the received data. Client 104 may itself represent communication with another network such as networks associated with a particular locality, region, building, etc.

The wavelength $\lambda_{xx}$ is separated from a multi-wavelength signal input to node 102 (arriving from the left in FIG. 1) by a demultiplexer 106. Alternatively, the drop portion of an optical add-drop multiplexer may substitute for demultiplexer 106. A locally generated $\lambda_{xx}$ is inserted into the light flow output of node 102 to the left by a multiplexer 108, which may be replaced by the add portion of an optical add-drop multiplexer.

Client 104 will typically not be configured to participate directly in the multi-wavelength optical network. If client 104 communicates via an optical interface, the wavelength or wavelengths used will only be locally specified and will not be selected in accordance with a wavelength scheme globally defined for the optical network. Also, any optical signals transmitted by client 104 will not necessarily be amplified to the level required for inter-node transmission in the network. The optical signals transmitted and received by client 104 will be modulated with client data. Alternatively, client 104 will have an electrical interface. A bidirectional transponder 110 will thus play a key role in this architecture.

Bidirectional transponder 110 amplifies and demodulates wavelength $\lambda_{xx}$, recovers the data carried by $\lambda_{xx}$, and then uses this data to re-modulate an optical or electrical signal to client 104. In the other direction, transponder 110 receives an optical or electrical signal from client 104, recovers the data and uses it to modulate an optical signal on wavelength $\lambda_{xx}$ and amplify this optical signal to a launch power appropriate for transmission to the node originating the incoming $\lambda_{xx}$ signal. The wavelength $\lambda_{xx}$ is specified within a scheme defined for the optical network as a whole. One example of a commercially available implementation of transponder 110 is the ONS15454 10G MR Transponder available from Cisco Systems of San Jose, Calif.

An emerging application for the Internet and high-speed optical networks is video distribution. This is a unidirectional application. The remote clients do not generate data. Each node is responsible for recovering data from the wavelength dedicated to video distribution for client processing and for retransmitting that information on to the next node.

It would be desirable to use bidirectional transponders as currently exist for this application. This is because such transponders are already readily available and also because it is desirable to combine unidirectional and bidirectional applications in the same network. For example, it may be desirable to dedicate certain wavelengths to bidirectional applications and other wavelengths to unidirectional applications without requiring separate unidirectional and bidirectional transponders.

Problems arise, however, in attempting to utilize the presently available bidirectional transponders in unidirectional applications. Bidirectional transponders do not inherently include any capability for relaying information on one or more selected wavelengths on to a next node. This is because there is no internal coupling between the network side input and the network side output.

Figure 2:
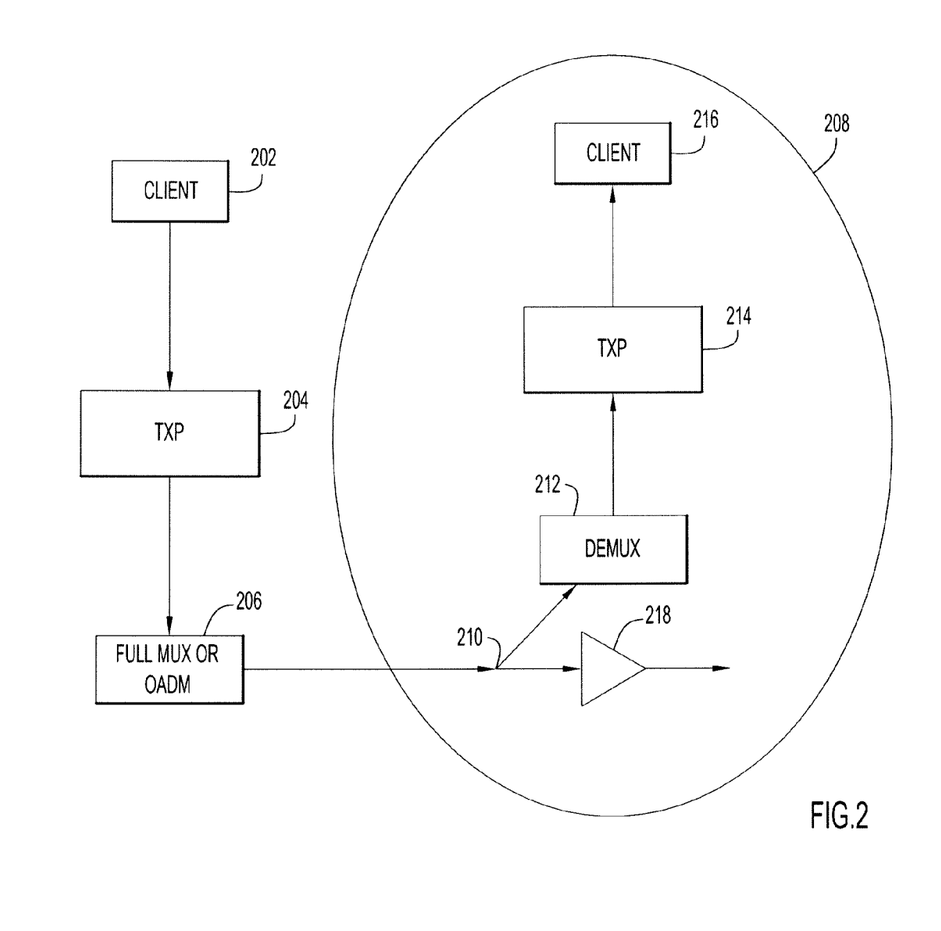
FIG. 2 depicts a prior art unidirectional optical communication architecture.

FIG. 2 depicts a prior art approach to employing bidirectional transponders for digital video distribution. A client 202 outputs a single-wavelength optical signal modulated with broadcast video information. This optical signal is presented to a bidirectional transponder 204. Bidirectional transponder 204 recovers data from the client signal and re-modulates it onto a wavelength selected for use in a multi-wavelength optical network. The network side output of transponder 204 is an input to a multiplexer 206 or the add portion of an optical add-drop multiplexer.

A representative node 208 is responsible for both recovering the video signal for its own client and for relaying the wavelengths carrying the video information on to the next node. Node 208 includes a splitter 210, which taps off a portion of the available optical power to be sent to a demultiplexer 212. Demultiplexer 212 selects the particular wavelength being used for unidirectional traffic and presents it to a bidirectional transponder 214. Bidirectional transponder 214 then recovers the video data from the unidirectional wavelength and re-modulates it onto an optical or electrical signal to be presented to a client 216. The bidirectional transponders 204 and 214 are made to work in the unidirectional application by simply omitting the client-side input for the selected unidirectional wavelength. Optical signal flow to the next node is optically amplified by amplifier 218.

The reliance on optical splitting and optical amplification for forwarding the unidirectional channels to the next node brings certain drawbacks. The insertion loss of splitter 210 imposes a performance loss, which may reduce the maximum spacing between nodes. Also, as the optical signal traverses the network, there is a limit to how many stages of purely optical amplification may be used before optical-electrical-optical conversion and regeneration will be necessary. Yet the capabilities of the bidirectional transponders in this respect are left unused. Furthermore, the architecture of FIG. 2 is not applicable to requirements for combined unidirectional and bidirectional operation.

What is needed are improved systems and methods for providing unidirectional communications via optical networks that employ bidirectional transponders.

SUMMARY OF THE INVENTION

According to embodiments of the present invention, systems and methods for unidirectional communication in an optical network employing bidirectional transponders are provided. The modulation and amplification capabilities of the bidirectional transponder are used to forward information to the next node. In this way a highly cost-effective "drop and continue" architecture is provided. In one implementation, the client-side output of the bidirectional transponder is looped back to the client-side input using, e.g., a Y-cable fiber. In this way, a unidirectional signal present on a network-side input wavelength to the transponder is presented both on a network-side output wavelength of the transponder and at the same time to a client. The modulation and amplification capabilities of the bidirectional transponder are thus exploited in forwarding the unidirectional signal to the next node.

A first aspect of the present invention provides a method for operating a node in a WDM communications system. The method includes: extracting a first selected wavelength from signal flow of a WDM network, passing the first selected wavelength to a network side input of a bidirectional transponder, using the bidirectional transponder to recover a signal from the first selected wavelength and present the recovered signal on a client side output of the bidirectional transponder, splitting the recovered signal between a client device and a client side input of the bidirectional transponder, using the bidirectional transponder to place information recovered from the client side input of the bidirectional transponder on a second selected wavelength, presenting the second selected wavelength on a network side output of the bidirectional transponder, and inserting the second selected wavelength into signal flow of the WDM network.

A second aspect of the present invention provides apparatus for operating a node in a WDM communications system. The apparatus includes: a bidirectional transponder that receives a first selected wavelength from signal flow of a WDM network, passes the first selected wavelength to a network side input of a bidirectional transponder, uses the bidirectional transponder to recover a signal from the first selected wavelength, and presents the recovered signal on a client side output of the bidirectional transponder, and a splitter that divides the recovered signal between a client device and a client side input of the bidirectional transponder. The bidirectional transponder is used to recover information from the client side input and place the information on a second selected wavelength presented on a network side output of the bidirectional transponder.

A third aspect of the present invention provides apparatus for operating a WDM communication network to broadcast information. The apparatus includes: a broadcast node that transmits the information via an optical wavelength, a plurality of receiver nodes in series with the broadcast node, each of the receiver nodes configured to: isolate a first selected wavelength received from a previous node in series, pass the first selected wavelength to a network side input of a bidirectional transponder use the bidirectional transponder to recover a signal from the first selected wavelength and present the recovered signal on a client side output of the bidirectional transponder; split the recovered signal between a client device and a client side input of the bidirectional transponder; use the bidirectional transponder to place information on a second selected wavelength, present the second selected wavelength on a network side output of the bidirectional transponder, and insert the second selected wavelength into a signal transmitted to a next node in series.

Further understanding of the nature and advantages of the inventions herein may be realized by reference to the remaining portions of the specification and the attached drawings.

DESCRIPTION OF SPECIFIC EMBODIMENTS

Figure 3:
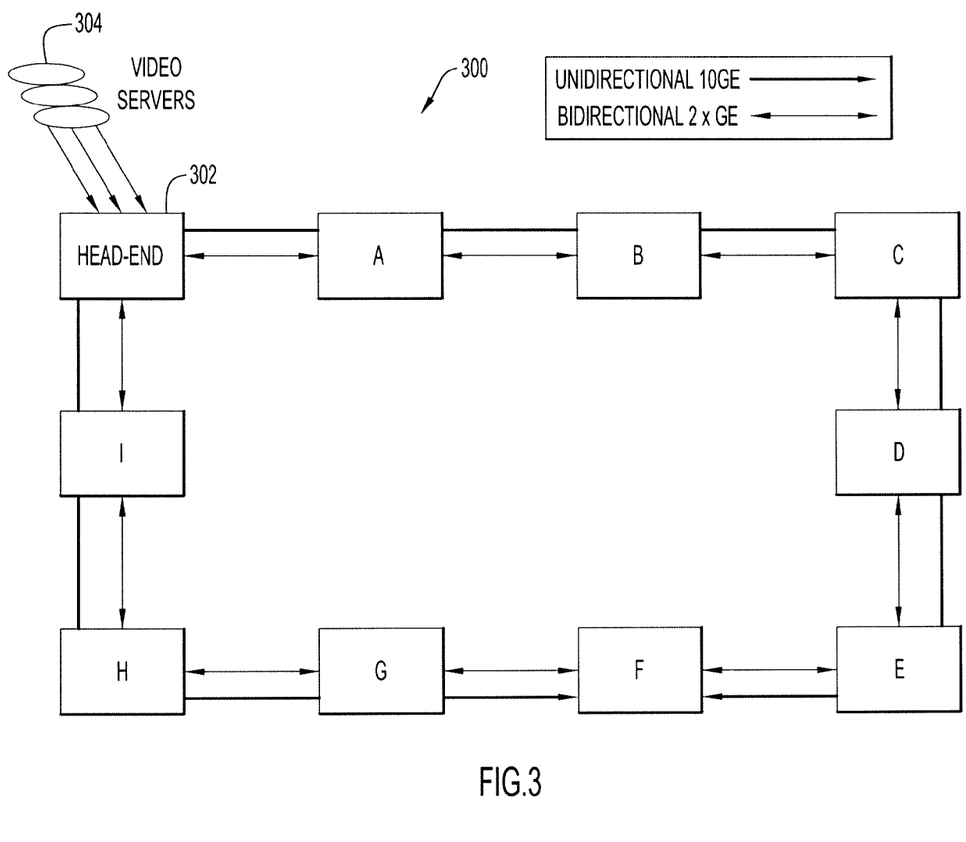
FIG. 3 depicts an optical network used for unidirectional video distribution and for bidirectional communication according to one embodiment of the present invention.

FIG. 3 depicts a representative optical network 300 to which embodiments of the present invention may be applied. Network 300 is configured as a dual dense wave division multiplexing (DWDM) ring. The present embodiment does not, however, is not limited to ring implementations, but may be used for other architectures such as mesh architectures, etc. Each wavelength carried by network 300 may be configured for either unidirectional or bidirectional traffic. A unidirectional wavelength will carry a 10 Gigabit Ethernet signal. A wavelength allocated to bidirectional communication will carry a Gigabit Ethernet signal in each direction, employing both rings. Gigabit Ethernet and 10 Gigabit Ethernet signals are merely examples of signal types that may be used.

Example network 300 includes a head-end node 302 and other nodes A through I. In one embodiment, the spacing between the nodes of network 300 is approximately 10 to 100 kilometers. Video material is sourced by a set of video servers 304 coupled to a client network device at head-end node 302. Each of nodes A through I include a client device such as a cable head-end, a terrestrial television broadcasting transmitter, or satellite uplink. The client devices receive video information from head-end node 302. There may be other client devices that participate in bidirectional data communications at one or more of nodes A through I. It will be appreciated that many other network configurations are suitable for use with the present invention.

Figure 4:
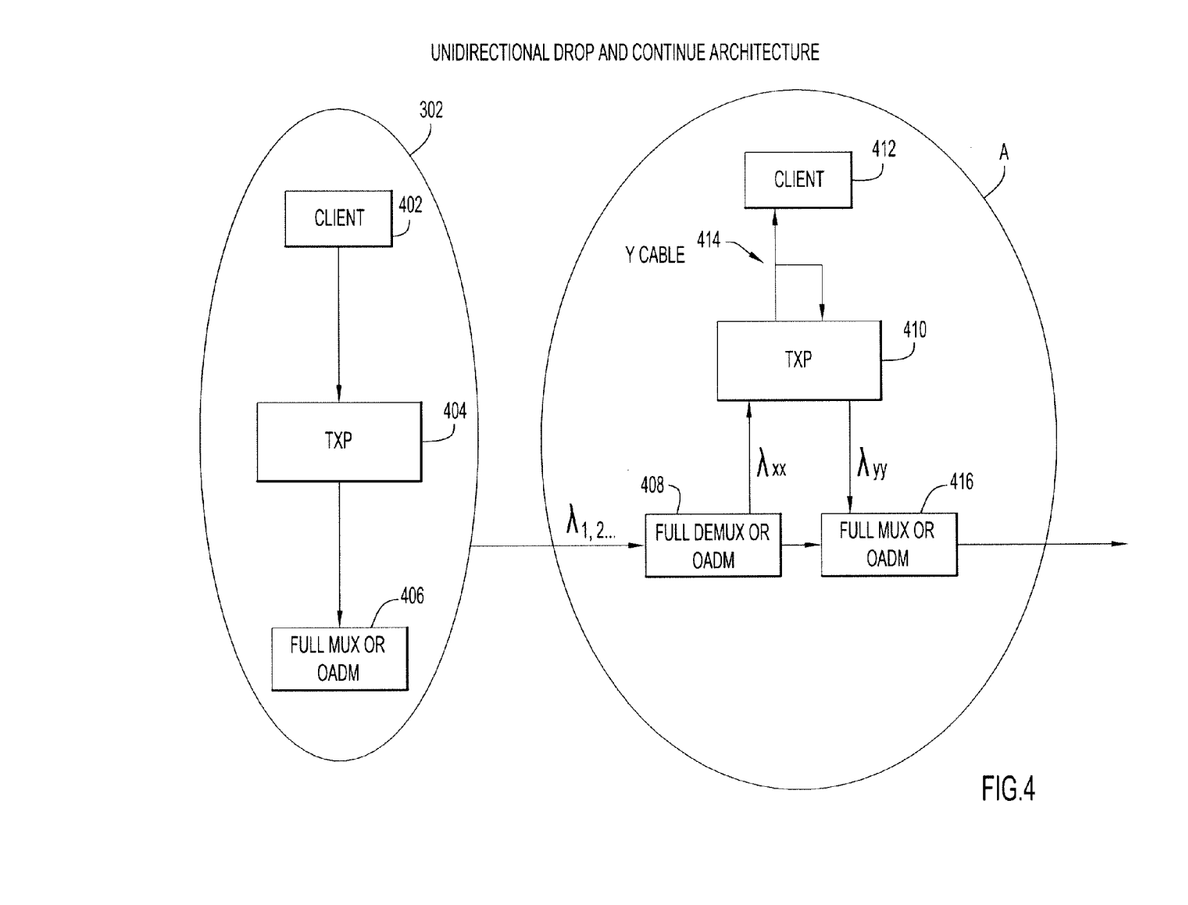
FIG. 4 depicts a unidirectional drop-and-continue architecture for optical communications according to one embodiment of the present invention.

FIG. 4 depicts elements of a unidirectional drop and continue architecture according to one embodiment of the present invention. FIG. 4 shows elements of head end 302 and node A. Head-end 302 includes a client network device 402. Client device 402 receives video information from video servers 304 and modulates this information in the appropriate 10 Gigabit Ethernet format onto a selected wavelength. The optical signal from client 402 is passed to bidirectional transponder 404. The optical signal used between client 402 and bidirectional transponder 404 has a "gray" wavelength, i.e., one that is not mandated by the overall operation of network 300.

Bidirectional transponder 404 demodulates the optical signal from client 402 and recovers its data. This data is then used to modulate another optical signal, which is generated and amplified by transponder 404. The amplification is to the level necessary for transmission to the next node. The network-side output of transponder 404 is an optical signal on a wavelength assigned for unidirectional communication. This wavelength is input to a multiplexer 406 or alternatively an add portion of an optical add-drop multiplexer. The operation of node 302 has been explained with reference to a single unidirectionally transmitted wavelength. It will be appreciated that transponder 404 may also be used for other unidirectionally transmitted or received wavelengths or for wavelengths allocated to bidirectional communication. All of the wavelengths output by transponder 404 will be input to multiplexer 406. Multiplexer 406 will combine the various wavelengths and output them onto a single fiber which exits node 302.

The multi-wavelength optical signal that exits node 302 reaches node A. There may be optical amplification stages between node 302 and node A. The operation of node A will be described with reference to a particular unidirectional optical signal which arrives on $\lambda_{xx}$. A demultiplexer 408 (or drop module of an optical add-drop multiplexer) selects wavelength $\lambda_{xx}$ and provides it to a network-side input of transponder 410. Transponder 410 demodulates the optical signal of wavelength $\lambda_{xx}$, recovers the data and re-modulates it onto another wavelength defined for use in communication with a client 412. This wavelength used for communication between transponder 410 and client 412 is another "gray" wavelength. Client 412 itself may be a network device such as a cable head-end or some other network device used to connect to a video distribution system.

According to embodiments of the present invention, so-called "Y cable" is used to connect transponder 410 and client 412. The Y cable 414 incorporates an optical splitter or tap coupler that allows a portion of the client-side optical output of transponder 410 to be tapped off and directed towards a client-side input of transponder 410. As shown in the drawings, there is a simple direct connection to the client-side input of transponder 410 and the splitter or coupler is a simple static element. The optical signal input on the client-side of transponder 410 is demodulated, the data is recovered and this data is re-modulated onto a network-side optical output on a wavelength $\lambda_{yy}$. The wavelength $\lambda_{yy}$ can be the same as or different from the wavelength $\lambda_{xx}$. The $\lambda_{yy}$ signal is output to a multiplexer 416 (or drop module of an optical add-drop multiplexer) where it is combined with other wavelengths selected by demultiplexer 408 to be passed through the node.

It will be seen then that bidirectional transponder 410 has been used in its off-the-shelf configuration to handle unidirectional traffic without the need to insert additional optical amplification hardware or a splitter into the optical signal flow through node A. This is a highly cost-effective solution that does not impact the maximum distance between nodes. Also, transponder 410 can be configured to accommodate disparate client-side and network-side wavelength specifications. Furthermore, transponder 410 allows the unidirectional signal to be monitored for purposes such as, e.g., fault location and performance monitoring.

In an alternative embodiment, the client-side communication for the bidirectional transponder is in electrical form rather than optical. In such applications, an electrical loopback substitutes for Y cable 414. The electrical loopback may be implemented by e.g., an application-specific integrated circuit (ASIC).

Figure 5:
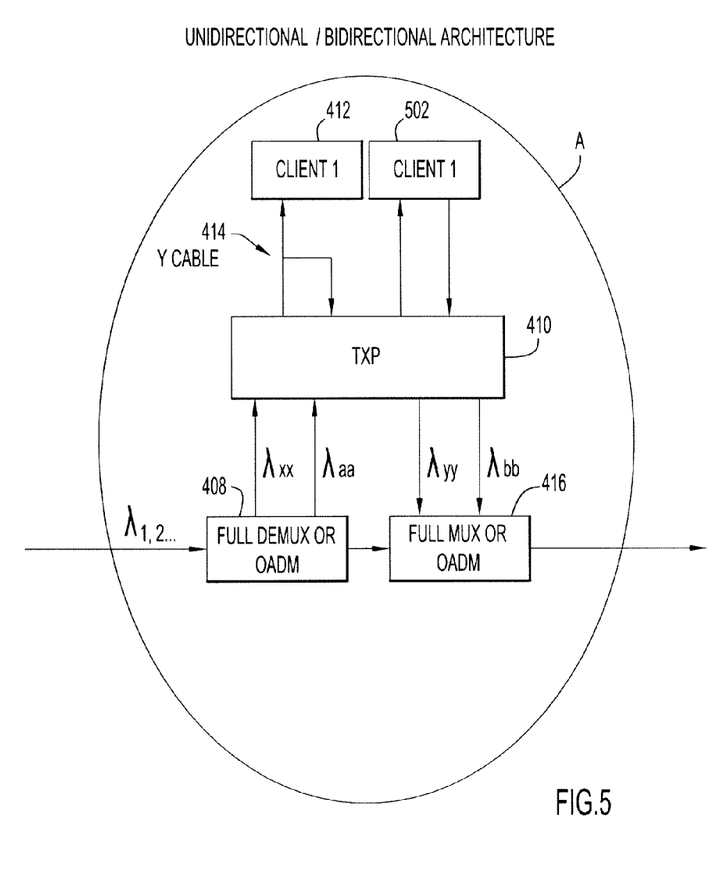
FIG. 5 depicts a combined unidirectional and bidirectional architecture according to one embodiment of the present invention.

FIG. 5 depicts elements of node A in the context of a combined unidirectional/bidirectional architecture according to one embodiment of the present invention. In FIG. 5, transponder 410 handles an additional wavelength that has been allocated for bidirectional communications. In addition to separating out wavelength $\lambda_{xx}$, the multiplexer 408 also selects a wavelength $\lambda_a$ for processing by transponder 410. For $\lambda_{aa}$, transponder 410 operates as a normal bidirectional transponder. Data recovered from $\lambda_{aa}$ is modulated onto an optical signal that is send to a second client device 502. Client device 502 may represent, e.g., a head-end for a data-over-cable network or some other network that provides bidirectional internet access.

Client 502 also transmits an optical signal to bidirectional transponder 410. The wavelength(s) used for communication between transponder 410 and client 502 need not be coordinated with client 412 or the overall operation of network 300. Transponder 410 recovers data from the client 502 optical signal and re-modulates it onto a wavelength $\lambda_{bb}$ for transmission to a multiplexer 504 which inserts wavelength $\lambda_{bb}$ in the return signal flow. $\lambda_{bb}$ may be the same as or different than $\lambda_{aa}$. Transponder 410 amplifies the $\lambda_{bb}$ signal to the level necessary for transmission to the next node. In this way, unidirectional and bidirectional communications are combined. It will, of course, be appreciated that there may be more than one unidirectional wavelength or more than one bidirectional wavelength handled at any given node.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method comprising:

extracting a first selected wavelength from an optical signal flow of a wavelength division multiplexed (WDM) network;

passing said first selected wavelength to a network side input of a bidirectional transponder, wherein said network side input is not internally coupled to a network side output of said bidirectional transponder;

using said bidirectional transponder to recover a signal from said first selected wavelength and present said recovered signal on a client side output of said bidirectional transponder;

splitting and passing said recovered signal with a splitter device that is external to said bidirectional transponder comprising an input and first and second outputs, wherein said input is connected to said client side output, said first output is directly connected to a client device, and said second output is directly connected to a client side input of said bidirectional transponder, and wherein a return path is not physically available from said client device to said bidirectional transponder;

using said bidirectional transponder to place information recovered from said client side input on a second selected wavelength;

presenting said second selected wavelength on said network side output; and inserting said second selected wavelength into said signal flow of said WDM network.

2. The method of claim 1 wherein said first selected wavelength and said second selected wavelength are the same wavelength.

3. The method of claim 1 wherein said first selected wavelength and said second selected wavelength are different wavelengths.

4. The method of claim 1 wherein said recovered signal comprises an optical signal modulated with information recovered from said first selected wavelength.

5. The method of claim 1 wherein splitting and passing comprises employing an optical Y cable.

6. The method of claim 1 wherein said recovered signal comprises an electrical signal modulated with information recovered from said first selected wavelength.

7. The method of claim 6 wherein splitting and passing comprises employing an electrical loopback.

8. The method of claim 1 further comprising:

employing said bidirectional transponder in a bidirectional mode to recover data from a third wavelength and transmit data on a fourth wavelength.

9. The method of claim 1 further comprising:

extracting a third selected wavelength from said signal flow of said WDM network;

passing said third selected wavelength to said network side input of said bidirectional transponder;
using said bidirectional transponder to recover a second signal from said third selected wavelength and present said second recovered signal on a second client side output of said bidirectional transponder;
passing said second recovered signal directly to a second client device;
passing a signal originating from said second client device directly to a second client side input of said bidirectional transponder;
using said bidirectional transponder to place information recovered from said second client side input of said bidirectional transponder on a fourth selected wavelength;
presenting said fourth selected wavelength on a network side output of said bidirectional transponder; and
inserting said fourth selected wavelength into an optical signal flow that is opposite said optical signal flow of said WDM network.

10. A method comprising:
providing a broadcast node that transmits information in an optical signal path via an optical wavelength;
providing a plurality of receiver nodes in series with said broadcast node, each of said receiver nodes configured to:
  isolate a first selected wavelength received from a previous node in series;
  pass said first selected wavelength to a network side input of a bidirectional transponder, wherein said network side input is not internally coupled to a network side output of said bidirectional transponder;
  use said bidirectional transponder to recover a signal from said first selected wavelength and present said recovered signal on a client side output of said bidirectional transponder;
  split and pass said recovered signal with a splitter device that is external to said bidirectional transponder comprising an input and first and second outputs, wherein said input is connected to said client side output, said first output is directly connected to a client device, and said second output is directly connected to a client side input of said bidirectional transponder, and wherein a return path is not physically available from said client device to said bidirectional transponder;
  use said bidirectional transponder to place information on a second selected wavelength and present said second selected wavelength on said network side output; and
  insert said second selected wavelength into a signal transmitted to a next node in series.

11. The method of claim 10 wherein said first selected wavelength and said second selected wavelength are the same wavelength.

12. The method of claim 10 wherein said first selected wavelength and said second selected wavelength are different wavelengths.

13. The method of claim 10 wherein said recovered signal comprises an optical signal modulated with information recovered from said first selected wavelength.

14. The method of claim 10, wherein providing said plurality of receiver nodes comprises providing each receiver node that is configured to:
  extract a third selected wavelength from said optical signal path;
  pass said third selected wavelength to said network side input of said bidirectional transponder;
  use said bidirectional transponder to recover a second signal from said third selected wavelength and present said second recovered signal on a second client side output of said bidirectional transponder;
  pass said second recovered signal directly to a second client device;
  pass a signal originating from said second client device directly to a second client side input of said bidirectional transponder;
  use said bidirectional transponder to place information recovered from said second client side input of said bidirectional transponder on a fourth selected wavelength;
  present said fourth selected wavelength on a network side output of said bidirectional transponder; and
  insert said fourth selected wavelength into an optical signal flow that is opposite the information transmitted by said broadcast node in said optical signal path.

15. An apparatus comprising:
a bidirectional transponder comprising a network side input, a client side output, a network side output, and a client side input, wherein said bidirectional transponder is configured to receive a first selected wavelength at said network side input from a signal flow of a wavelength division multiplexed (WDM) network, recover a signal from said first selected wavelength, and supply said recovered signal on said client side output, wherein said network side input is not internally coupled to said network side output; and
a splitter that is external to said bidirectional transponder having a first output terminal configured to be connected directly to a client device and a second output terminal configured to be connected directly to said client side input, wherein said splitter is configured to divide and pass said recovered signal between said client device and said client side input, and wherein a return path is not physically available from said client device to said bidirectional transponder; and
wherein said bidirectional transponder is configured to recover information from said client side input and place said information in a second selected wavelength supplied on said network side output.

16. The apparatus of claim 15 further comprising:
a demultiplexer that is configured to extract said first wavelength from signal flow of said WDM network; and
a multiplexer that is configured to insert said second selected wavelength into signal flow of said WDM network.

17. The apparatus of claim 15 wherein said first selected wavelength and said second selected wavelength are the same wavelength.

18. The apparatus of claim 15 wherein said first selected wavelength and said second selected wavelength are different wavelengths.

19. The apparatus of claim 15 wherein said splitter comprises an optical Y cable.

20. The apparatus of claim 15 wherein said splitter comprises an electrical loopback.

21. The apparatus of claim 15, wherein said bidirectional transponder further comprises a second client side input and a second client side output, and wherein said bidirectional transponder is further configured to extract a third selected wavelength from said signal flow of said WDM network, pass said third selected wavelength to said network side input, recover a second signal from said third selected wavelength and present said second recovered signal on said second client side output, pass said second recovered signal directly to a second client device, pass a signal originating from said second client device directly to said second client side input, place information recovered from said second client side input on a fourth selected wavelength, present said fourth selected wavelength on a network side output, and insert said fourth selected wavelength into an optical signal flow that is in an opposite direction of said optical signal flow of said WDM network.

22. A system comprising:
- a broadcast node that is configured to transmit information in an optical signal path via an optical wavelength;
- a plurality of receiver nodes in series with said broadcast node, each of said receiver nodes configured to:
  - isolate a first selected wavelength received from a previous node in series, pass said first selected wavelength to a network side input of a bidirectional transponder, wherein said network side input is not internally coupled to a network side output of said bidirectional transponder;
  - use said bidirectional transponder to recover a signal from said first selected wavelength and present said recovered signal on a client side output of said bidirectional transponder;
  - split and pass said recovered signal with a splitter device that is external to said bidirectional transponder comprising an input and first and second outputs, wherein said input is connected to said client side output, said first output is directly connected to a client device, and said second output is directly connected to a client side input of said bidirectional transponder, and wherein a return path is not physically available from said client device to said bidirectional transponder;
  - use said bidirectional transponder to place information on a second selected wavelength and present said second selected wavelength on said network side output of said bidirectional transponder; and
  - insert said second selected wavelength into a signal transmitted to a next node in series.

* * * * *